(12) United States Patent
Miyoshi et al.

(10) Patent No.: US 7,140,674 B2
(45) Date of Patent: Nov. 28, 2006

(54) VEHICLE BODY FRAME STRUCTURE

(75) Inventors: Shinsuke Miyoshi, Okazaki (JP);
Takashi Yakata, Toyoake (JP);
Takayuki Yatabe, Okazaki (JP);
Takashi Kikuchi, Kasugai (JP); Keishi Goto, Okazaki (JP); Koji Shibata, Okazaki (JP)

(73) Assignees: Mitsubishi Jidosha Kogyo Kabushiki Kaisha, Tokyo (JP); Mitsubishi Jidosha Engineering Kabushiki Kaisha, Kawasaki (JP)

( * ) Notice: Subject to any disclaimer, the term of this patent is extended or adjusted under 35 U.S.C. 154(b) by 0 days.

(21) Appl. No.: 10/926,100

(22) Filed: Aug. 26, 2004

(65) Prior Publication Data

US 2005/0046237 A1    Mar. 3, 2005

(30) Foreign Application Priority Data

Aug. 29, 2003  (JP)  ............................. 2003-307455
Aug. 29, 2003  (JP)  ............................. 2003-307456

(51) Int. Cl.
*B62D 25/02* (2006.01)
*B62D 25/08* (2006.01)

(52) U.S. Cl. ........................... 296/203.03; 296/203.02; 296/193.05; 296/30

(58) Field of Classification Search ................. 296/30, 296/193.05, 203.02, 203.03
See application file for complete search history.

(56) References Cited

U.S. PATENT DOCUMENTS

| 4,545,612 | A | * | 10/1985 | Harasaki | ................. | 296/203.02 |
| 4,883,309 | A | * | 11/1989 | Miyazaki et al. | ...... | 296/193.09 |
| 5,085,484 | A | * | 2/1992 | Mori | ........................... | 296/204 |
| 6,209,950 | B1 | * | 4/2001 | Hanyu | .................... | 296/203.02 |
| 6,511,120 | B1 | * | 1/2003 | Mitts | ........................... | 296/202 |
| 6,648,404 | B1 | * | 11/2003 | Yakata et al. | ................ | 296/209 |

FOREIGN PATENT DOCUMENTS

| JP | 359011976 | * | 1/1984 | ............ 296/203.02 |
| JP | 3070857 U |  | 5/2000 |  |
| JP | 3089814 U |  | 8/2002 |  |

* cited by examiner

*Primary Examiner*—Dennis H. Pedder
(74) *Attorney, Agent, or Firm*—Birch, Stewart, Kolasch & Birch, LLP (57) ABSTRACT

A vehicle body frame structure capable of realizing the connection to a side body in the form of structural connection. The vehicle body frame structure includes a side body whose skeleton is formed by a body panel that forms a side face of the vehicle body and a reinforcement member that is formed into a shape extending along the inside of the body panel and joined to the body panel, a front frame member that forms a front body disposed to form a shape extending from the side body to the front of the vehicle body, and an outer frame member joined to the front frame member from side of the vehicle body and secured to the reinforcement member by means of bolts extending through the body panel.

8 Claims, 6 Drawing Sheets

VEHICLE BODY FRAME STRUCTURE

CROSS-REFERENCE TO A RELATED APPLICATION

This nonprovisional application claims priority under 35 U.S.C. §119(a) on Patent Application Nos. 2003-307455 and 2003-307456 both filed in Japan on Aug. 29, 2003, the entire contents of which are hereby incorporated by reference.

BACKGROUND OF THE INVENTION

1. Field of the Invention

This invention relates to a vehicle body frame structure, and more particularly, to a vehicle body frame structure that provides an improved connection structure between a front body and a side body.

2. Description of the Related Art

In a vehicle body, various components such as an engine, front wheel suspensions, a radiator, and the like are generally mounted to a front body. Thus, the front body has various parts varying in rigidity. A side body, which is disposed on a rear side of the front body, is required to have a function of suppressing the vehicle body from being deformed in a height direction thereof.

The connection between the front body and the side body is sometimes performed by connecting together a hood ridge member (upper frame) of the front body and an outer panel (body pane) of the side body through an outer frame member. The outer frame member is joined to the hood ridge member and the outer panel from outside of the vehicle body. From the viewpoint of the order of connection between the hood ridge member and the side body, the outer frame member is the component that is finally assembled by welding.

The connection between the outer frame member and the hood ridge member is achieved by performing spot welding to the outer frame member, whereas the connection between the outer frame member and the outer panel is achieved by performing arc welding to the outer panel which is made of a thin sheet material.

As understood, the connection to the side body is not a structural connection. This poses a problem that from the viewpoint of durable strength of the vehicle body, the connection becomes one of the most fracturable parts. In this regard, a technical art of a vehicle body frame structure in which a front body and a side body are bolted together through a reinforcing member is disclosed in Japanese Utility Model Registration No. 3089814 (3rd to 5th paragraphs, FIG. 4, etc.).

In the prior art disclosed in Japanese Utility Model Registration No. 3089814, plates each consisting of a metal sheet are joined together by means of bolts to thereby reinforce the connection between the front body and the side body. This makes it possible to increase the rigidity without occurrences of fracture at weld joint portions.

However, such joining method using bolts can merely achieve reinforcement by means of plates or metal sheets which are small in cross-section effect, and hence the connection to the side body cannot still be considered as a structural connection.

The part of connection to the side body still remains one of the most fracturable parts, and entails a problem of providing a poor endurance strength of the vehicle body. In other words, the prior art disclosed in Japanese Utility Model Registration No. 3089814 does not pay a particular attention to the necessity to achieve a structural connection.

The variety is demanded for recent sedan vehicles, such that vehicles be more sporty and improved in steering performance, and the like. To this end, it is especially required to increase the rigidity of the front body. In this respect, a technical art for a vehicle body frame structure which connects a front body and a side body together with use of a reinforcement is proposed in Japanese Utility Model Registration No. 3070857 (6th to 9th paragraphs, FIG. 2, etc.).

The prior art disclosed in Japanese Utility Model Registration No. 3070857 comprises a diagonal member serving as a reinforcement that is disposed between the front body and the side body.

In order to connect the front body and the side body so as to improve the rigidity of vehicle body, not only the connection to the front body but also the connection to the side body is required to provide a structural connection.

The prior art disclosed in Japanese Utility Model Registration No. 3070857 achieves the connection to the side body by utilizing the reinforcement simply connected to a door hinge. This cannot be considered as a structural connection, and still entails a problem of a poor rigidity of the vehicle body.

In this prior art, the connection part to the front body is arranged to project in the vehicle width direction. With this arrangement, when a force is generated in the front body, more specifically, when input exerting in the height direction of the vehicle body is caused by vibration of a strut tower serving as a suspension tower, for instance, such force cannot reliably and adequately be introduced, resulting in a problem of fear that it is difficult to cope with torsion or bending. That is, this prior art does not pay a special attention to the necessity of increasing the rigidity resisting the input to the strut tower. This causes a problem that it is difficult to cope with the variety of vehicles.

SUMMARY OF THE INVENTION

The present invention provides a vehicle body frame structure capable of realizing a connection to a side body which is a structural connection.

According to this invention, there is provided a vehicle body frame structure, which comprises: a side body whose skeleton is formed by a body panel that forms a side face of a vehicle body and a reinforcement member that is joined to the inside of the body panel in a shape extending along the body panel; a front frame member that forms a front body extended from the side body toward the front of the vehicle body; and an outer frame member joined to said front frame member from side of the vehicle body and fixed to the reinforcement member.

The vehicle body frame structure of this invention provides a rigid skeleton obtained by connecting the reinforcement member and the body panel together, and the outer frame member is fixed to the skeleton, whereby the connection to the side body as a structural connection can be realized, and the endurance strength of the vehicle body can be increased.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE PREFERRED EMBODIMENTS

With reference to the appended drawings, a vehicle body frame structure according to a first embodiment of this invention will be explained.

Figure 1:
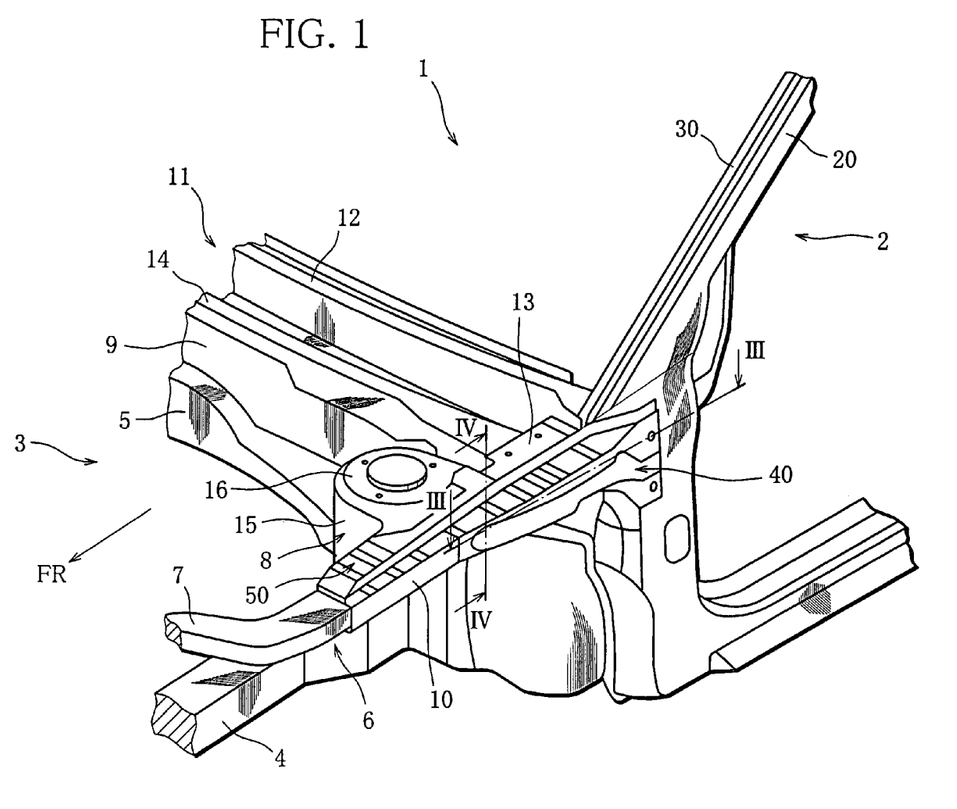
FIG. 1 is a perspective view of a vehicle body structure to which a vehicle body frame structure according to a first embodiment of this invention is applied.
Figure 2:
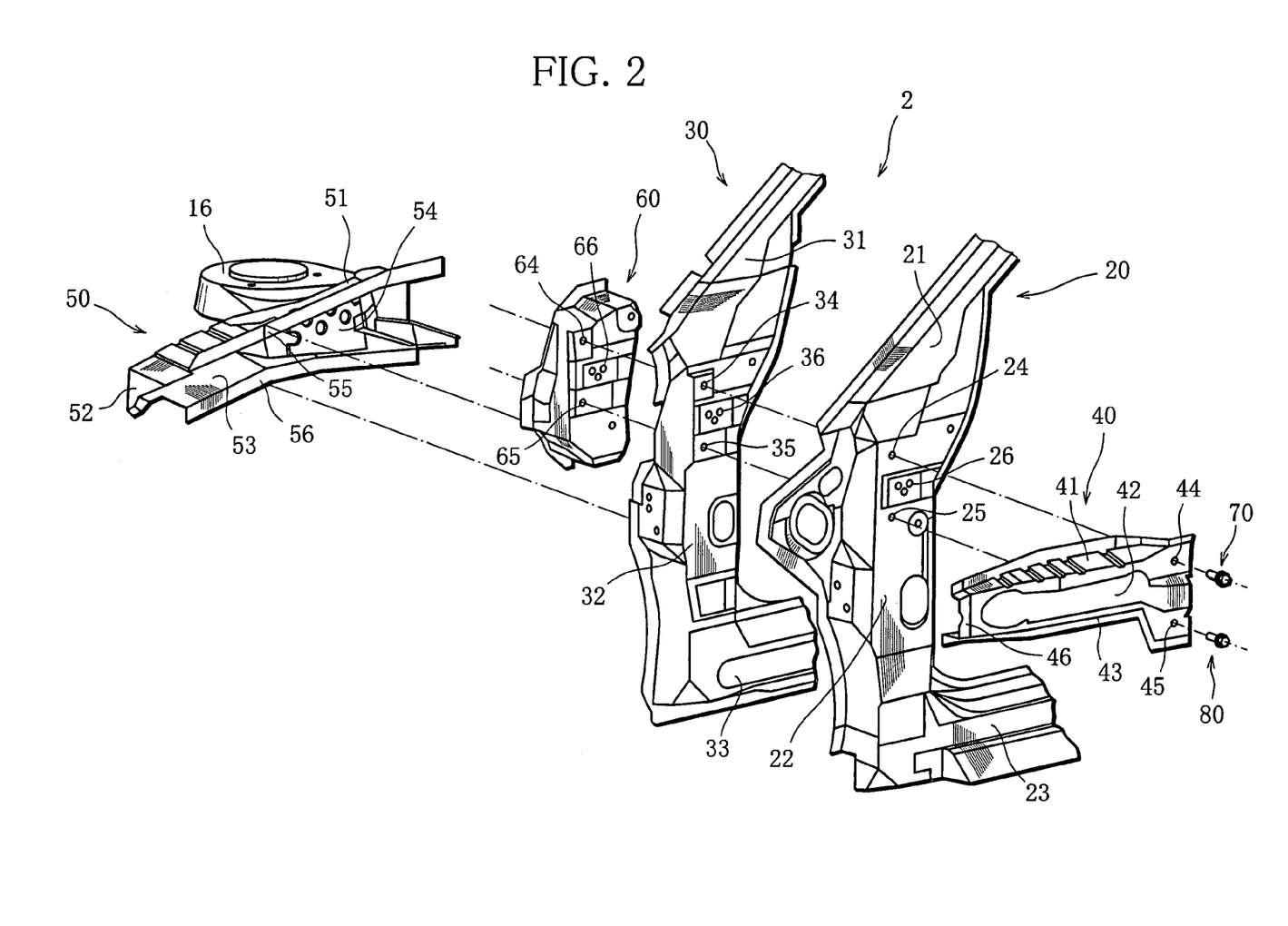
FIG. 2 is a fragmentary exploded perspective view of the vehicle body frame structure shown in FIG. 1.

Referring to FIG. 1, a left-side vehicle body structure around an engine room of a sedan vehicle is shown in perspective view, which structure includes the vehicle body frame structure of this embodiment. FIG. 2 shows the vehicle body frame structure of FIG. 1 in fragmentary exploded perspective view. A vehicle body around the engine room will be explained with reference to FIGS. 1 and 2. Meanwhile, a right-side vehicle structure (not shown) is symmetrical to the left-side vehicle structure with respect to the vehicle center.

In a front body 3 around the engine room of the vehicle body 1, there are provided a pair of left and right front side members 4 which are coupled to each other by means of a front cross member (not shown) and a dash cross member 5 and to which lower portions of a pair of left and right hood ridges (front frame member) 6 are connected, respectively.

A lower portion of a dash panel 9 is connected to the dash cross member 5, and left and right portions of the dash panel 9 are connected to rear portions of the left and right hood ridges 6 and front portions of a pair of left and right side bodies 2, respectively.

A cowl top 11 is connected to an upper portion of the dash panel 9. The cowl top 11 has left and right portions thereof respectively connected to upper portions of the left and right hood ridges 6 through left and right extensions 13 that are used to fix hood hinges (not shown). The cowl top 11 is comprised of a cowl top lower 14 open toward upward of the vehicle body 1 and having a rear portion thereof connected to a cowl top inner (not shown), and a cowl top upper 12 connected to an upper portion of the cowl top lower 14 and cooperating with the cowl top inner to form a closed cross section. The cowl top 11 is constituted to have an open cross section.

A pair of left and right strut towers 8 are formed integrally with or separately from the left and right hood ridges 6, respectively. These strut towers 8 serve as suspension towers for supporting strut front suspensions (not shown) for front wheels, which are steered wheels. Each strut tower 8 includes a strut base 16 which is formed as a house in a top of the strut tower 8 and around which a tower panel 15 is provided.

Hood ridge members 7 are connected to upper portions of the hood ridges 6. An upper frame inner 50 formed into a U-shape in cross section open outwardly in the vehicle width direction and an upper frame outer 10 formed into a U-shape in cross section open inwardly in the vehicle width direction are connected to a rear end of a corresponding one of the hood ridge members 7.

The upper frame inner 50 and the strut tower 8 are formed into one piece. An outer frame member (upper frame extension) 40 is connected to rear portions of the upper frame inner 50 and the upper frame outer 10 from outside of the vehicle body 1. The outer frame member 40 is formed into a U-shape in cross section open inwardly in the vehicle width direction, and cooperates with the upper frame inner 50 to form a closed cross section in the longitudinal direction of the vehicle body 1. The outer frame member 40 is secured to the side body 2 by means of bolts.

Referring to FIG. 2, the outer frame member 40 is comprised of an outer upper part 41 having an upward-directed flange portion, and a main portion thereof extending outwardly in the vehicle width direction from the upward-directed flange portion; an outer side part 42 thereof extending downward from the outer upper part 41; and an outer lower part 43 having a main portion thereof extending inwardly in the vehicle width direction from the outer side part 42, and a downward-directed flange portion. The outer side part 42 has a front portion 46 thereof connected to the upper frame outer 10, and a rear portion thereof in which bolt insertion holes 44, 45 are formed at appropriate positions.

As shown in FIG. 2, the upper frame inner 50 is comprised of an inner upper part 51 having a flange portion corresponding to the flange portion of the outer upper part 41; an inner side part 52 extending downward from the inner upper part 51; and an inner lower part 53 extending inwardly in the vehicle width direction from the inner side part 52 and having a flange portion corresponding to the flange portion of the outer lower part 43. The inner side part 52 has its front portion that is connected to the hood ridge member 7. Each of the flange portions of the inner upper and lower parts 51, 53 has front and rear zones located on the front and rear sides, respectively, with respect to a boundary portion 55 or 56. The upper frame outer 10 and the outer frame member 40 are joined to the front and rear zones of the flange portion, respectively, from outside of the vehicle body 1.

As shown in FIG. 2, the side body 2 is constituted by an outer panel (body frame) 20 and a reinforcement member 30 that is connected to the outer panel 20.

The outer panel 20 is comprised of a pillar upper 21 extended downward from the roof side of the vehicle body 1, a pillar lower 22 located beneath the pillar upper 21, and a side sill 23 extended from a lower end of the pillar lower 22 toward the rear of the vehicle body 1. The pillar lower 22 is formed at appropriate positions with bolt insertion holes 24, 25 corresponding to the bolt insertion holes 45, 46. Reference numeral 26 denotes door mounting holes.

The reinforcement member 30 used to reinforce the outer panel 20 is comprised of a reinforce upper 31 to reinforce the pillar upper 21, a reinforce lower 32 to reinforce the pillar lower 22, and a reinforce sill 33 to reinforce the side sill 23. The reinforce lower 32 is formed with bolt insertion holes 34, 35 corresponding in position to the bolt insertion hoes 24, 25. Reference numeral 36 denotes door mounting holes. The outer panel 20 and the reinforcement member 30 are formed into one piece, making it possible to form a rigid skeleton.

A door hinge upper 60 is disposed to face the outer frame member 40 with the side body 2 held therebetween. The door hinge upper 60 is formed into a shape to have a width that is wide enough to form bolt insertion holes 64, 65 at locations on the both sides of door mounting holes 66. The door hinge upper 60 is provided with weld nuts to which bolts 70, 80 are threadedly engaged. The door hinge upper 60 thus widened and provided with the bolting nuts makes it possible to provide a stronger connection to the side body 2.

Figure 3:
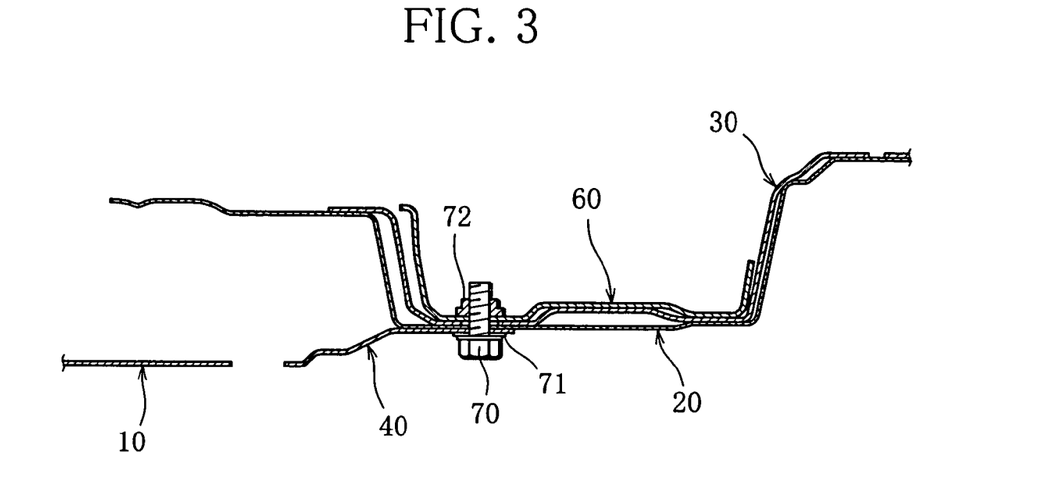
FIG. 3 is a section view of the vehicle body frame structure taken along line III—III in FIG. 1.

When the bolts 70, 80 are individually inserted into the bolt insertion holes 44, 45, with the outer frame member 40 aligned with the side body 2, these bolts are inserted into the bolt insertions holes 24, 34, 64; 25, 35, 65, respectively. In FIG. 3, the vehicle body frame structure of FIG. 1 is shown in cross sectional view taken along line III—III. As understood from FIG. 3, when the bolt 70 extending through the bolt insertion holes 44, 24, 34 and 64 individually formed in the outer frame member 40, the outer panel 20, the reinforcement member 30, and the door hinge upper 60 is threadedly engaged with the weld nut 72 through the washer 71 from outside of the vehicle body 1, the outer frame member 40 is bolted and secured to the reinforcement member 30 of the side body 2.

Figure 4:
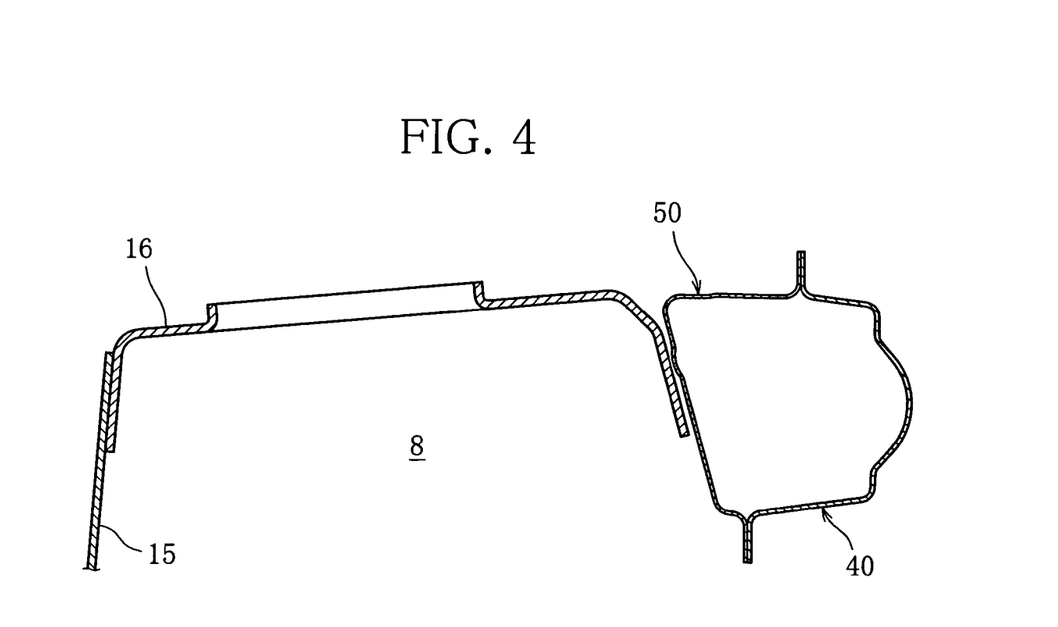
FIG. 4 is a section view of the vehicle body frame structure taken along line IV—IV in FIG. 1.

The upper frame inner 50 is constructed integrally with the strut tower 8 through a welding face 54 (FIG. 2). In FIG. 4, the vehicle body frame structure of FIG. 1 is shown in cross sectional view taken along line IV—IV. Specifically, the upper frame inner 50 and the strut base 16 are spot-welded and formed into one piece. Since the upper frame inner 50 and the outer frame member 40 are welded together, input to the strut tower 8 is conveyed to the front body 3 through the upper frame inner 50, and is also conveyed effectively to the side body 2 through the outer frame member 40. In other words, a force generated in the strut tower 8 can be effectively dispersed.

As described above, in this embodiment, the outer frame member 40 forming part of the skeleton of the front body 3 is mounted to the reinforcement member 30 forming part of the skeleton of the side body 2. As a result, the connection to the side body 2 is realized by the connection to the rigid skeleton, which is a structural connection, thus improving the endurance strength of the vehicle body 1.

The aforementioned connection to the side body 2 using the outer frame member 40 is achieved by the alteration from arc-welding to bolting and the alteration of the door hinge upper 60 to a widened structure having a width that is wide enough to ensure the bolting face, thus making it possible to connect the outer frame member 40 directly to members whose strength is increased by the reinforcement member 30 and the door hinge upper 60, whereby the endurance strength of the vehicle body 1 can be increased with a little modification to the structure of the existing vehicle body.

Next, with reference to FIGS. 5–8, a vehicle body frame structure according to a second embodiment of this invention will be explained.

Figure 5:
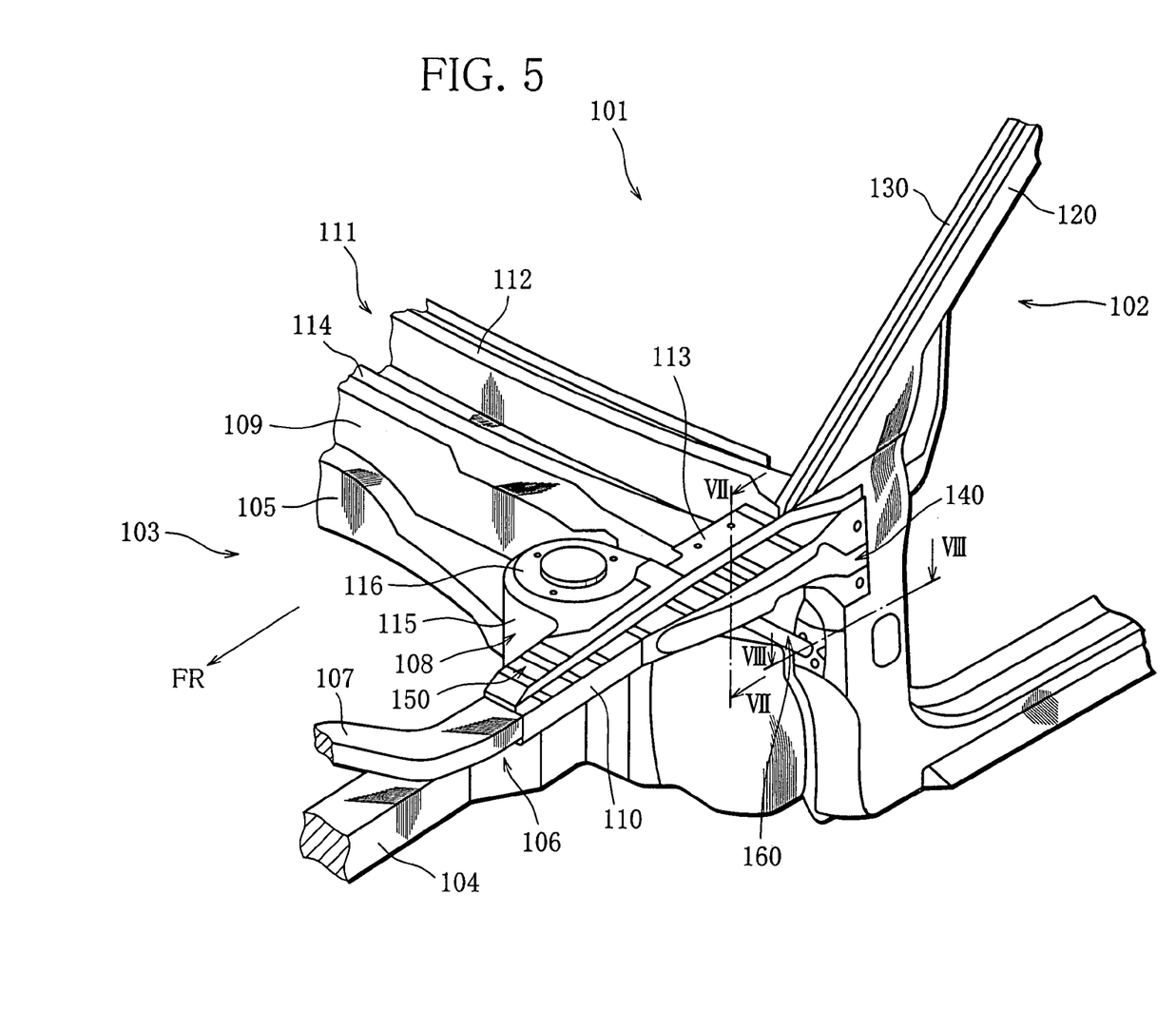
FIG. 5 is a perspective view of a vehicle structure to which a vehicle body frame structure according to a second embodiment of this invention is applied.
Figure 6:
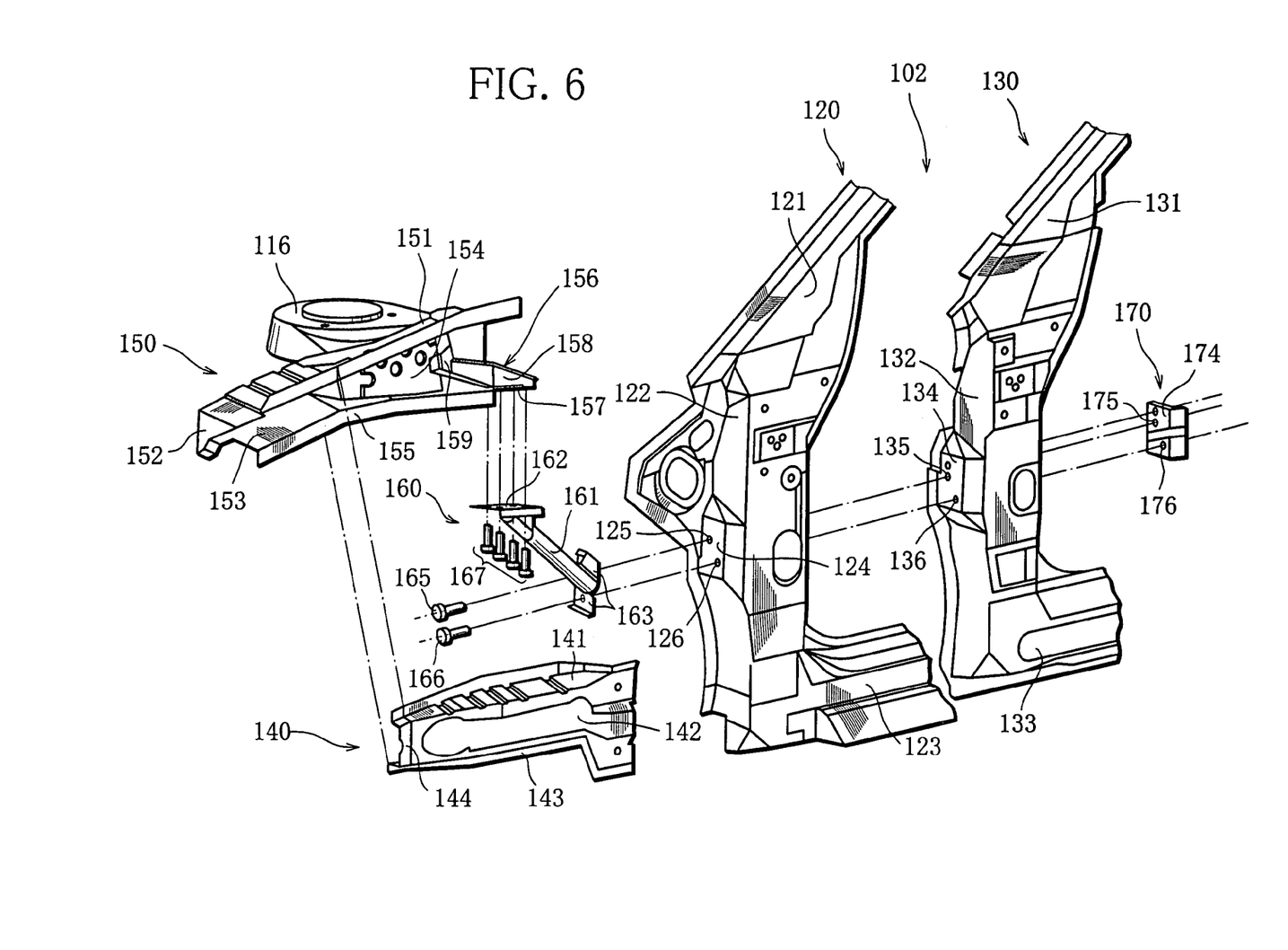
FIG. 6 is a fragmentary exploded perspective view of the vehicle body frame structure shown in FIG. 5.

FIGS. 5 and 6 show a left-side vehicle body structure around an engine room of a sedan vehicle, which structure includes the vehicle body frame structure of this embodiment. A right-side vehicle structure (not shown) is symmetrical to the left-side vehicle structure with respect to the vehicle center.

As shown in FIG. 5, the vehicle body frame structure of this embodiment is basically the same as that of the first embodiment shown in FIG. 1 except in that it comprises a brace member which reinforces the connection between the front body and the side body. In FIGS. 5–8, elements corresponding to those shown in FIGS. 1–4 are each denoted by reference numeral equal to the sum of reference numeral in FIGS. 1–4 and 100.

The following is a brief explanation on the structure common to the first embodiment. In a front body 103 of a vehicle body 101, left and right front side members 104 are coupled to each other by means of a front cross member (not shown) and a dash cross member 105. A pair of left and right hood ridges 106 are connected to the dash cross member 105 to which a dash panel 109 is connected. The dash panel 109 has left and right sides thereof connected to the left and right hood ridges 106 and a pair of left and right side bodies 102, respectively. Connected to the dash panel 109 is cowl tops 111 which are connected to the left and right hood ridges 106 through left and right extensions 113, respectively. A pair of left and right strut towers 108 are formed integrally with or separately from the left and right hood ridges 106, respectively.

There are provided left and right hood ridge members 107 that are connected to the left and right hood ridges 106, respectively. An upper frame inner 150 and an upper frame outer 110 are connected to each of the hood ridge members 107. An outer frame member 140 is connected to the upper frame inner 150 and the upper frame outer 110. The outer frame member 140 is secured to a corresponding one of the side bodies 102 by means of bolts. The hood ridge members 107, the upper frame inner 150, the upper frame outer 110, and the outer frame member 140 constitute a front frame member.

As shown in FIG. 6, the outer frame member 140 is comprised of an outer upper part 141, an outer side part 142, and an outer lower part 143. The upper frame inner 150 is comprised of an inner upper part 151, an inner side part 152, an inner lower part 153, and a reinforcement part 156. The inner side part 152 has its front portion that is connected to the hood ridge member 107. Each of the flange portions of the inner upper and lower parts 151, 153 has front and rear zones respectively located on the front and rear sides with respect to a boundary portion 155. The upper frame outer 110 and the outer frame member 140 are connected to the front and rear zones of the flange portions, respectively.

The following is an explanation of features of the vehicle body frame structure of this embodiment.

The upper frame inner 150 is constructed integrally with the strut tower 108 through a welding face 154 provided in a central portion of the inner side part 152. The reinforcement part 156 is comprised of a brace joining face portion 157 adapted to be joined to the brace member 160, a flange portion 158, and a weld portion 159 to be joined to the welding face 154, etc. At the brace joining face portion 157 and the flange portion 158, the reinforcement part 156 is formed into a hat shape in cross section as viewed in the vehicle width direction. Weld nuts with which bolts are threadedly engaged are formed in the brace joining face portion 157.

Thus, the upper frame inner 150 is provided with the reinforcement part 156 that is formed into a hat shape in cross section in the vehicle width direction and adapted to be joined to the brace member 160 and the strut base 116 of the strut tower 108.

As shown in FIG. 6, the side body 102 is constituted by an outer panel 120 and a reinforcement member 130 that is connected to the outer panel 120.

The outer panel 120 is comprised of a pillar upper 121 extended downward from the roof side of the vehicle body 101, a pillar lower 122 located beneath the pillar upper 121, and a side sill 123 extended from a lower end of the pillar lower 122 toward the rear of the vehicle body 101. The pillar lower 122 is formed at appropriate positions with a brace joining face portion 124 adapted to be joined to the brace member 160 and formed at appropriate positions with bolt insertion holes 125 and 126.

The reinforcement member 130 is comprised of a reinforce upper 131, a reinforce lower 132, and a reinforce sill 133. The reinforce lower 132 is formed with a brace joining face portion 134 corresponding in position to the brace joining face portion 124, and is formed with bolt insertion holes 135, 136 corresponding in position to the bolt insertion hoes 125, 126. The outer panel 120 and the reinforcement member 130 are formed into one piece, thereby forming a rigid skeleton.

The brace member 160 for connecting the brace joining face portions 157 and 134 with each other via the shortest distance to thereby reinforce the connection between the front body 103 and the side body 102 is disposed in a space that is defined between the brace joining face portion 157 of the upper frame inner 150 and the brace joining face portion 134 of the reinforcement member 130 through the outer panel 120. This arrangement makes it possible to increase the rigidity resisting input exerted in the vertical direction of the vehicle body 101 and caused by vibration from the strut tower 108, or the like.

The brace member 160 is comprised of a frame joining face portion 162 adapted to be joined to the brace joining face portion 157 by means of bolts 167, a hollow brace shaft portion 161 obliquely extended from a lower face of the frame joining face portion 162 toward the brace joining face portion 134, and a pillar joining portion 163 adapted to receive the brace shaft portion 161 and to be joined to the brace joining face portions 124, 134 or the like by means of bolts 165, 166.

Another reinforce member 170 used to further reinforce the side body 102 is disposed to face the pillar joining portion 163, with the side body 102 sandwiched therebetween.

The reinforcement member 170 has a front portion 174 adapted to be abutted against a rear face of the brace joining face portion 134 of the reinforcement member 130. The reinforcement member 170 is formed with bolt insertion holes 175, 176 to which bolts 165, 166 are inserted, and weld nuts with which the bolts 165, 166 are threadedly engaged.

The outer frame member 140 is aligned with the upper frame inner 150, and the brace member 160 is disposed beneath the outer frame member 140. Then, the frame joining face portion 162 brought in abutment with the brace joining face portion 157, with the outer frame member 140 disposed therebetween, is secured thereto by means of the bolts 167. As a result, the brace member 160, more specifically, the brace shaft portion 161, is in alignment with the outer frame member 140 and the upper frame inner 150 as viewed from above the vehicle body 101, so that they are arranged on the same axis.

Figure 7:
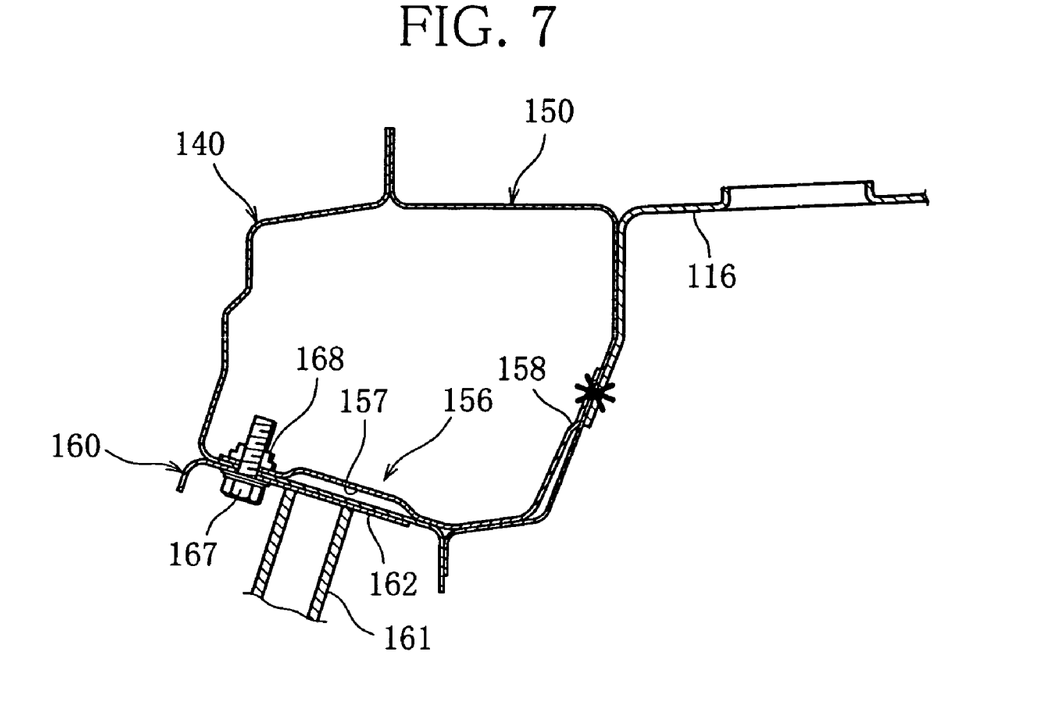
FIG. 7 is a section view taken along line VII—VII in FIG. 5.

As shown in FIG. 7, when the bolts 167 are threadedly engaged with the weld nuts 168 from beneath the vehicle body 101 through the frame joining face portion 162 and the brace joining face portion 157, the brace member 160 is secured to the reinforcement part 156 of the upper frame inner 150 in a fashion that the brace member 160 is disposed beneath and hidden by the outer frame member 140 and the upper frame inner 150 as seen from above the vehicle body 101.

DETAILED DESCRIPTION OF THE INVENTION

The reinforcement member 130 is joined to the outer panel 120, and another reinforcement member 170 is aligned therewith. Subsequently, the brace member 160 is disposed from front of the outer panel 120, and the pillar joining part 163 brought in abutment with the brace joining face portion 134, with the brace joining face portion 124 sandwiched therebetween, is secured thereto by means of the bolts 165, 166.

Figure 8:
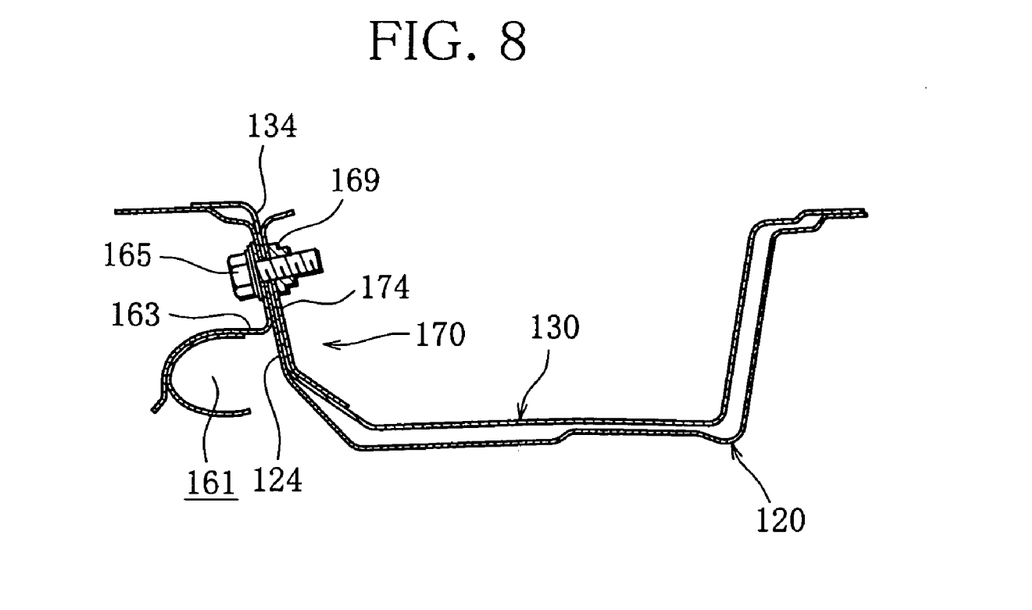
FIG. 8 is a section view taken along line VIII–VII in FIG. 5.

As shown in FIG. 8, when the bolt 165 is threadedly engaged with the weld nut 169 from front of the vehicle body 101 through the pillar joining part 163, the brace joining face portion 124, the brace joining face portion 134, and the front portion 174, the brace shaft portion 161 is disposed on the same axis as the outer panel 120 and the reinforcement member 130 as seen from above the vehicle body 101, and is secured to the brace joining face portion 134 of the reinforcement member 130.

As described above, in this embodiment, the brace member 160 is provided that extends from the reinforcement member 130 serving to form the skeleton of the side body 102 toward the upper frame inner 150 serving to form part of the skeleton of the front body 103. Therefore, input to the strut tower 108 can be bone by both the front body 103 and the side body 102, whereby the vehicle body 101, especially, a portion at which the connection to the side body 102 is made and a portion around the front strut can have an increased rigidity resisting torsion and bending.

The brace member 160 is so disposed as to connect part constituted by the outer frame member 140 and the upper frame inner 150 with part constituted by the outer panel 120 and the reinforcement member 130 over the shortest distance. As seen from side of the vehicle body 101, on the side of the front body 103, the brace member 160 is disposed at a position where it overlaps the strut tower 108. On the side of the side body 102, the brace member 160 is disposed as far as possible away from that part of the outer frame member 140 which is connected to the side body 102. With the above arrangement, it is possible to reinforce the connection between the front body 103 and the side body 102.

As seen from side of the vehicle body 101, a triangle is formed by those parts, which are constituted by the outer frame member 140 and the upper frame inner 150; the outer panel 120 and the reinforcement member 130; and the brace member 160, respectively, and which are on the same axis. This arrangement effectively bears input to the strut tower 108. In addition, these parts supporting the strut tower 108 serve to suppress minute absolute deformation thereof, and therefore, sensitivity to the vehicle body 101 is increased, and the steering performance can be improved.

Furthermore, a closed cross section is provided by the outer frame member 140 and the upper frame inner 150 in the strut tower 108 serving as input point. The strut tower 108 is connected to the brace member 160 through the reinforcement part 156. In the brace joining face portion 124 of the outer panel 120 serving as fulcrum, the brace member 160 is connected to the reinforcement member 130 reinforced by another reinforcement member 170. Thus, the rigidity resisting input from the strut tower 108 can further be increased.

In the above, explanations for the first and second embodiments have been given. This invention is not limited to these first and second embodiments, and may be modified variously within the scope of this invention.

For example, the upper frame inner 50, 150 may be formed in the form of a planar panel other than the frame of a U-shape in cross section in the first and second embodiments, so long as the upper frame inner 50, 150 cooperates with the outer frame member 40, 140 to form a closed cross section. As for the reinforcement part 156 of the second embodiment, it is not limited to the one which is a hat-shape in cross section, so long as it can increase the rigidity resisting input to the strut tower 108.

In the first and second embodiments, the outer frame member 40, 140 is constructed in the form of an extension member separately from the upper frame outer 10, 110. However, the outer frame member 40, 140 is not limited in construction thereto, but may be constructed integrally with the upper frame outer 10, 110 and/or the upper frame inner 50, 150 extended from the hood ridge member 7, 107 to the rear of the vehicle body 1, 101. Also in this case, the connection to the side body can be a structural connection to thereby improving the rigidity of the vehicle body 101, as with the case mentioned above.

In the first embodiment, the reinforcement member is formed into a shape substantially following the outer panel 20. However, this invention is not limited thereto. For instance, the joining between the outer frame member 40 and the reinforcement member 30 may be one that follows at least the outer panel 20.

What is claimed is:

1. A vehicle body frame structure, comprising:
    a side body whose skeleton is formed by a body panel that forms a side face of a vehicle body and a reinforcement member that is joined to inside of the body panel in a shape extending along the body panel, the reinforcement member being made of a single piece material;
    a front frame member that forms a front body extended from said side body toward front of the vehicle body; and
    an outer frame member, provided separately from the reinforcement member, joined to said front frame member from a side of the vehicle body and fixed to said reinforcement member
    wherein said outer frame member is fixed to said reinforcement member by means of a bolt extending through said body panel.

2. The vehicle body frame structure according to claim 1, further comprising:
    a hinge reinforcement that reinforces a door hinge portion, said hinge reinforcement being disposed inside of said reinforcement member, and said bolt being threadedly engaged with the hinge reinforcement.

3. The vehicle body frame structure according to claim 1, wherein said front frame member is disposed integrally with a suspension tower house inside of the vehicle body, said front frame member cooperating with said outer frame member to form a closed cross section in a longitudinal direction of the vehicle body.

4. The vehicle body frame structure according to claim 3, further comprising:
    a brace member that connects said front frame member with said reinforcement member.

5. The vehicle body frame structure according to claim 4, wherein said brace member and said front frame member are disposed on the same axis as seen from above the vehicle body.

6. The vehicle body frame structure according to claim 5, wherein said brace member cooperates with said front frame member and said reinforcement member to form a triangle.

7. The vehicle body frame structure according to claim 4, wherein said brace member includes a hollow shaft portion, and joining face portions provided at opposite ends of said hollow shaft portion and adapted to be joined to said frame member and said reinforcement member, respectively.

8. The vehicle body frame structure according to claim 4, wherein said front frame member is formed into a hat-shape in cross section as seen in a vehicle width direction, and includes a reinforcement portion that is adapted to be joined to said brace member and the suspension tower.

* * * * *